Sept. 19, 1967     N. BREWER     3,342,069
OPEN CHANNEL FLOWMETER

Filed March 31, 1965     5 Sheets-Sheet 1

INVENTOR.
NATHANIEL BREWER
BY

ATTORNEYS

INVENTOR.
NATHANIEL BREWER

INVENTOR.
NATHANIEL BREWER

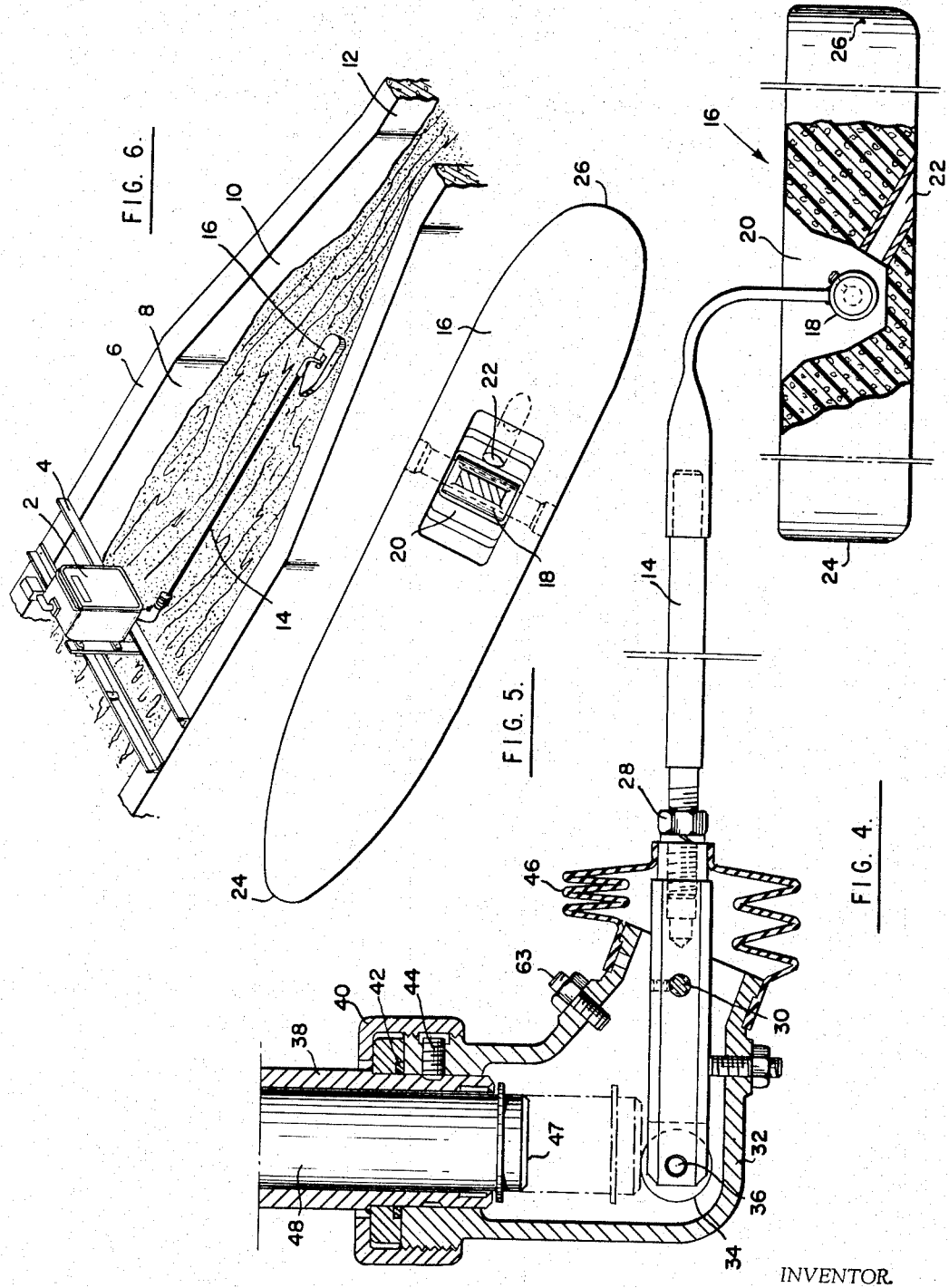

INVENTOR.
NATHANIEL BREWER

United States Patent Office 3,342,069
Patented Sept. 19, 1967

3,342,069
OPEN CHANNEL FLOWMETER
Nathaniel Brewer, Newtown, Pa., assignor to Fischer & Porter Company, Warminster, Pa., a corporation of Pennsylvania
Filed Mar. 31, 1965, Ser. No. 444,211
3 Claims. (Cl. 73—215)

ABSTRACT OF THE DISCLOSURE

An open-channel flowmeter is provided with a float sensing liquid level upstream of a flume and linked to a lever arm. A contoured cam is adjustably mounted on the lever arm in order to translate the liquid level into a linear function of flow rate. The cam is adjustable about a pivot on the lever arm in order to accommodate different flume characteristics.

The float is boat-shaped and has a low specific gravity so that its displacement of liquid is relatively independent of flow rate.

---

This invention relates to open channel flowmeters and particularly to flowmeters of the type involving sensing of liquid level by a floating element positioned upstream of a flume or weir.

Flowmeters of the type just indicated are particularly useful when flow through open channels is permissible or advantageous, particularly when the flow contains solid material as in the case of sewage. Measurements of acceptable accuracy are secured by measurement of liquid level upstream of a restriction to flow. One of the most advantageous measuring systems is that utilizing the well-known Parshall flumes, which flumes may have throat widths ranging from around three inches to eight feet depending on the flow to be measured. The level of the liquid in advance of the throat of such a flume is a measure of flow in accordance with the equation:

$$Q = KWH^n$$

wherein:
Q is the flow in cubic feet per second;
K is a flow coefficient;
W is the flume width in feet measured at the throat;
H is the head in feet; and
n is the flume exponent.

For practical purposes, K is a constant. The value of $n$ is a function of the flume width, but varying only to a small, though significant, extent with the flume width.

The foregoing matters are well known in connection with Parshall flumes. Similar equations also hold for rectangular or V weirs.

In accordance with the present invention a flowmeter senses the flow rate by measurement of the liquid head with a buoyant float pivotally attached to the end of a lever arm. By means of a cam and linkage arrangement the measurement of head is converted to a linear signal proportional to flow. This linear signal is not only observable on a scale, but is suitable to control a transmitter of the time-pulse type controlling the duration of electrical pulses transmitted during a particular duty cycle, such as a fifteen second cycle. A receiving instrument for such pulses compares the relative off-to-on time duration during one duty cycle with the next to obtain a time differential which is utilized as a driving signal for a remote indicator or recorder. Such a transmission system does not form part of the present invention and is well known; but the present invention does relate to the provision of a linear mechanical output suitable for the operation of such transmitter.

In accordance with the present invention, provisions are made for head range adjustment and for flume width adjustment in a fashion to take care of the variation of the exponent $n$ referred to above.

A further aspect of the invention relates to the provision of a float which is both stable and insensitive to velocity changes, i.e., giving an accurate measure of head despite the changes in horizontal velocity of the liquid on which it rests.

The general objects of the present invention relate to the foregoing matters, and the attainment of these objects and of others particularly relating to advantageous matters of construction will become apparent from the following description, read in conjunction with the accompanying drawings, in which:

FIGURE 4 is a vertical section showing, in particular, the actuating elements including the float and its associated connections;

FIGURE 5 is a plan view of the float showing its general dimensions;

FIGURE 6 is a perspective view showing the measuring apparatus in conjunction with a Parshall flume;

Figure 1:
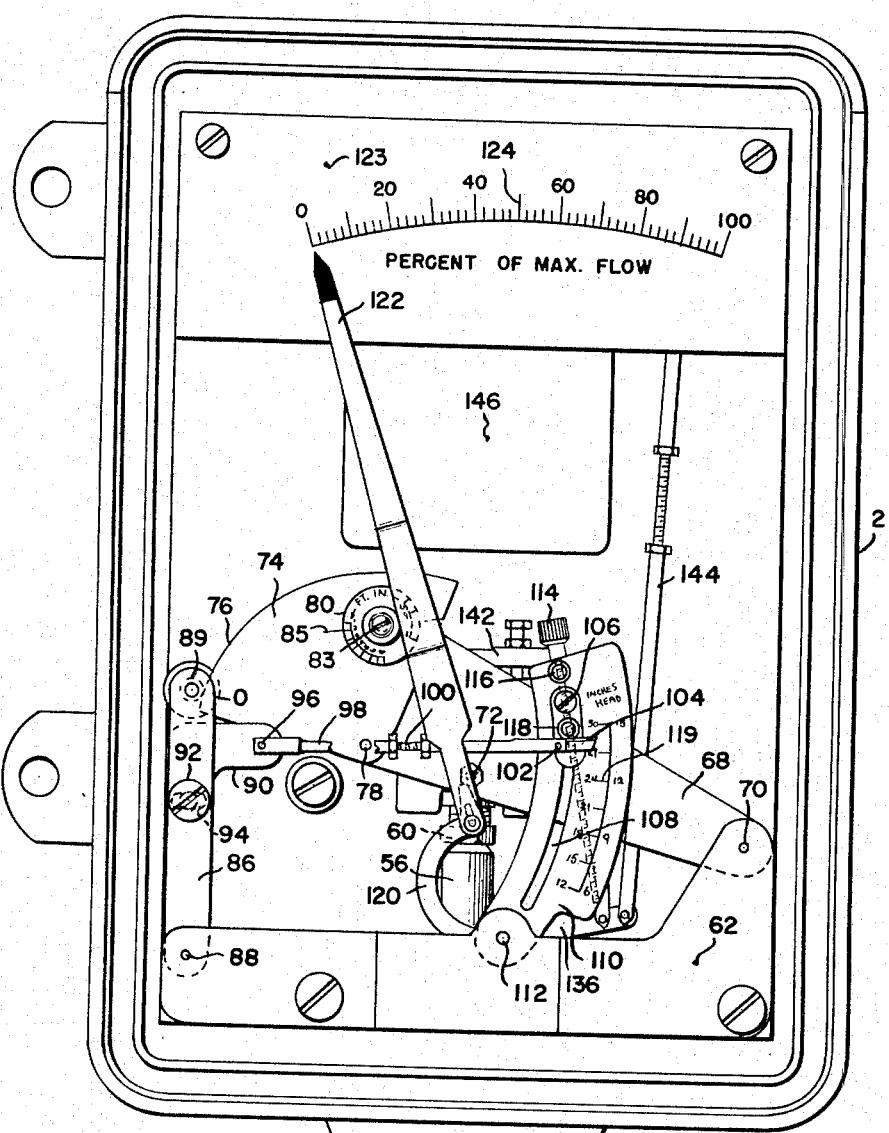
FIGURE 1 is an elevation of the face of an apparatus provided in accordance with the present invention with the cover removed to show internal details.
Figure 7:
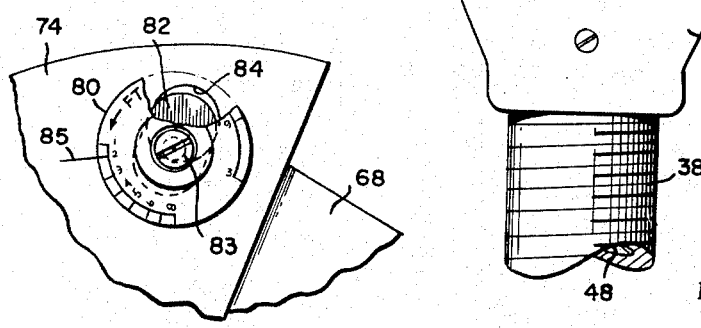
FIGURE 7 is an enlarged elevation, partially broken away, showing adjustment details.
Figure 2:
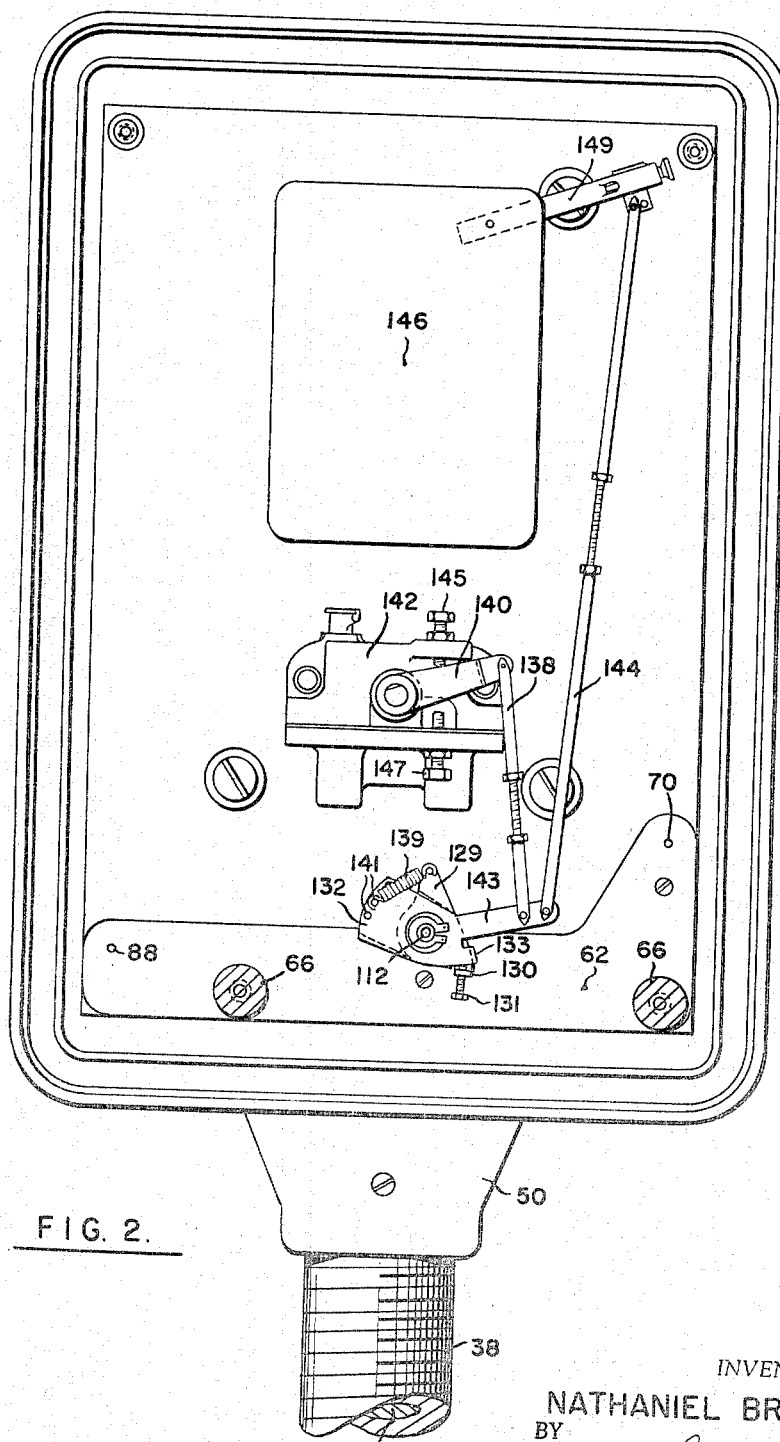
FIGURE 2 is an elevation similar to FIGURE 1 but showing parts behind those illustrated in FIGURE 1, certain of the parts being shown in section.

Referring first to FIGURE 6, the housing of the flowmeter is indicated at 2 suitably mounted by structural elements 4 above the approach passage 8 of a typical Parshall flume 6 which has the usual converging portion 10 leading to the throat 12. Detection of head is desirably made in the converging channel 10 by the float 16 which is pivoted to an arm 14 by a pin arrangement at 18 arranged transversely in a socket 20 in the float with provision of a drain outlet 22 to avoid accumulation of liquid in the socket 20.

The float 16 may be made of various materials but it has been found advantageous to form it by molding or shaping of a polyurethane foam which may be coated with an epoxy or polyester or equivalent resin to provide a relatively hard surface. Even without this coating the polyurethane foam is impervious since the gas is dispersed therein in discontinuous bubbles. The float has a low specific gravity and is thus capable of exerting an adequate force on the arm 14. As illustrated the float has a generally boat-like shape with a relatively sharp prow 24 facing upstream and a rounded stern 26. The bottom and top of the float are both flat, the sides merging with the bottom with rounded curvatures at the junctions. The relative dimensions of the float are desirably as illustrated in FIGURE 5 to provide a construction which, in comparison with conventional ball floats, is insensitive to liquid surface velocity. A typical float having the required high stability may have a length of 12½ inches, a width of 2½ inches and a height of 1⅝ inches with the pivot pin located 7½ inches from the prow, the polyurethane foam having a density of four pounds per cubic foot. The relative dimensions are not critical but are subject to considerable variation, as is also the size, though the boat-like shape is highly desirable. With such a shape and mounting arrangement high stability of the float position is achieved and, in particular, with very little change in the depth of submergence with change of linear velocity of the surface of the liquid passing through the flume.

The arm 14 is adjustable in length by reason of its being made in two parts threaded together and held in a final fixed relationship by a nut 28 and an associated lock washer. The pivot for the arm 14 is provided by the pin 30 on which it is mounted and which is arranged to rock in the housing 32. A roller 34 is journalled on a pin 36 extending transversely of the inner end of the arm 14.

A tube 38 carries the housing 32, secured thereto by a set screw 44 with an associated packing arrangement provided by an O-ring 42 clamped by a cap 40 threaded on the exterior of the upper end of the housing 32. The tube 38 is threaded at its upper end into the boss 50 provided as part of the main housing. Rotation of the housing 32 relative to the main housing is provided by the arrangement illustrated so that while the arm 14 extends lengthwise of the flume the main housing may be conveniently located to face in any desired direction for easy readability of the scale therein. To provide for free movement of the arm 14 but with liquid tight sealing, a flexible rubber bellows arrangement 46 is provided having ends which engage tightly the housing 32 and the arm, respectively.

The roller 34 is arranged to engage the lower end of a plunger 48 arranged to slide vertically within the tube 38. The upper end 54 of this plunger is continued as an extension 56 within which is threaded a screw 58 locked in adjusted position by a nut 60 and associated lock washer. The head of the screw 58 provides an abutment for the movement of a pin 72. In FIGURE 4 the plunger 48 is shown in full lines in its uppermost position corresponding to the reference zero of flow. In the same figure, however, the arm 14 is shown in the full flow position for convenience, and the plunger 48 is shown in construction lines as it would be for this flow, abutting the roller 34. An adjustable stop screw 63 limits the tilting movement of the arm 14.

Frame elements 62 and 64 are connected by spacers 66 and serve for the mounting of various movable elements of the assembly. An arm 68 is secured to a shaft 70 pivoted in the members 62 and 64 and carries the laterally extending pin 72 engageable by the screw 58, so that vertical movements of the plunger 48 rock this arm. A spring 71 urges the arm 68 downwardly to maintain the pin 72 in engagement with the screw 58. A cam 74 having a contoured edge 76 is pivoted at 78 to the arm 68 and the position of this cam relative to the arm is adjustable by the arrangement of a disc 80 having an eccentric portion 82 engaging within a slot 84 provided in the cam 74, the disc 80 being mounted on a screw 83 threaded into the arm 68, the screw being arranged to free the disc for adjustment when loosened and to lock the disc in position when tightened. The disc 80 is provided with markings to correspond to various flume widths, the markings being readable against a reference marking 85 on the cam 74.

The contour 76 of the cam 74 is so laid out as to give, for a definite position of the disc 80, a linear scale reading, taking into account the various linkages which will be described. What the adjustment of the disc 80 and its eccentric accomplishes is a variation of the contour 76 in its relationship to the center of movement, shaft 70, of the lever 68, so as to correct for the flume width, the correction taking care of the exponent $n$ which, as stated above, is a function of W. The adjustment here required is only slight, and the tilting of the cam relative to the arm 68 accomplishes the desired result. At this point it should be noted that the scale which is used is in terms of percentage of maximum flow. While the quantity of flow in volumetric units per minute would change very greatly with the width of the flume, this is not indicated directly. The percentage of maximum flow is the quantity actually indicated, and it will be noted from the flow equation given above that, if $Q/W$ is considered, the aspect of dependence on flume width primarily appears in the exponent $n$ which is a relatively slightly varying function of the width. Hence, the adjustment of the cam which is required is small and taken into account by the pivoting arrangement just described. Stated in a different way, the contour of the cam 76 takes care of the mean value of the exponent $n$ to achieve linearity with respect to head H while the variation of the positions of the contour 76 takes care of the changes of $n$ with width, relative to the mean value of $n$. The mean value of $n$ is approximately 1.550, and its range is from 1.522 to 1.578 for a change in flume throat width of one foot to four feet.

The arrangement so far mentioned applies to Parshall flumes; but the adjustment also applies to weirs. By reference to tables settings for weirs of particular shapes and sizes may be made, the tables giving information as to the proper index settings.

A lever 86 secured to a shaft 88 pivoted between the plates 62 and 64 mounts a follower roller 89 which follows the cam contour 76. A second lever 90 adjacent to the lever 86 is pivoted on the shaft 88 and adjustable relatively to the lever 86 and arranged to be locked in an adjusted position with respect to the lever by a screw 92 threaded into the lever 90 and passing through a slot 92 in the lever 86. This provides a zero adjustment for the linkage arrangement.

Pivoted to the lever 90 at 96 is a link 98 made in two relatively adjustable parts by reason of the screw connection of these parts indicated at 100. The right-hand end of this link is pivoted at 102 to a movable block 104 slidable in a curved slot 108 in an arm 110 which is secured to a shaft 112 pivoted between the plates 62 and 64.

Figure 3:
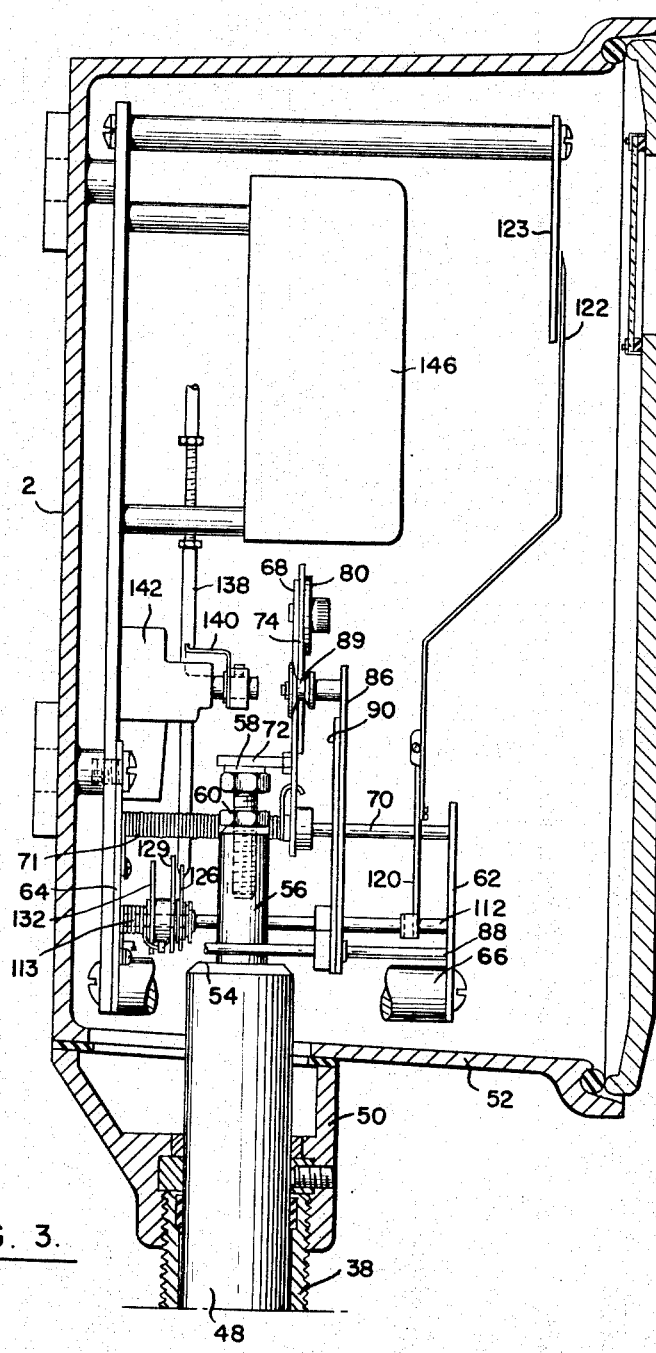
FIGURE 3 is a vertical section looking toward the right from the interior of the housing shown in FIGURE 1.
Figure 8:
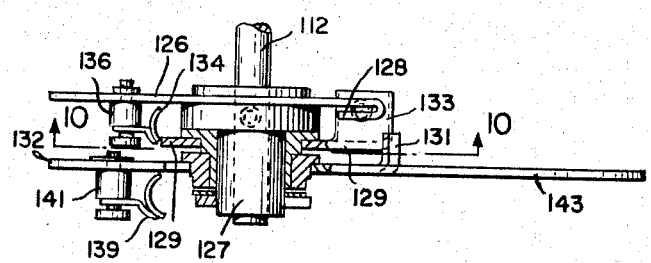
FIGURE 8 is a plan view, partly in section, of an overtravel assembly provided in the apparatus.
Figure 9:
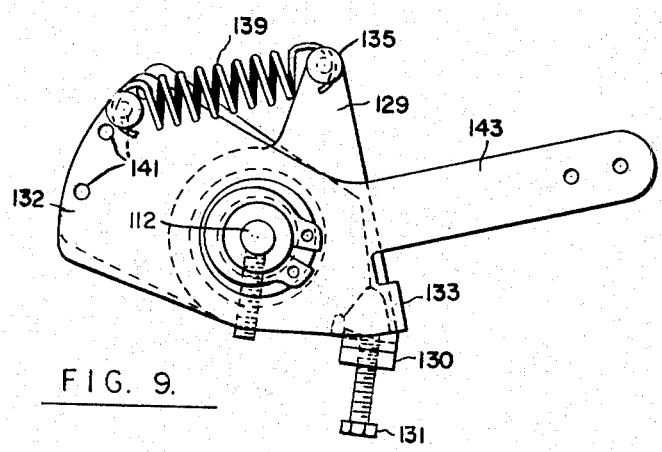
FIGURE 9 is an elevation of the overtravel assembly.
Figure 10:
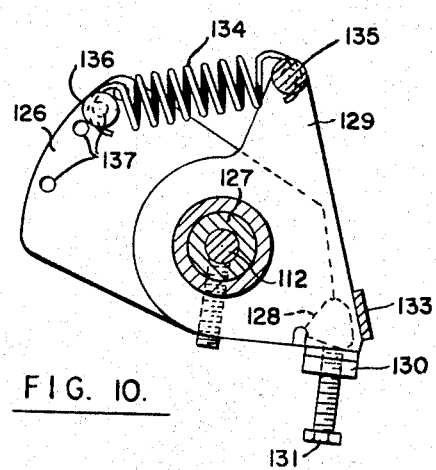
FIGURE 10 is a vertical section on the plane indicated at 10—10 in FIGURE 8.

This shaft and the parts carried thereby are urged clockwise by a spring 113 (FIGURE 3) to hold the follower roller 89 against the contour 76 of the cam 74. The block 104 is adjustable along the slot by means of a screw 114 which is journalled in a pivoted member 116 at the upper end of the lever 110 and is threaded through a member 118 pivoted to the block 104. The block carries an index edge readable against the graduations on a scale 119 indicative of range, and the adjustment just described which varies the effective lever arm of 110 is the range adjustment of the instrument. Also secured to the shaft 112 is the arm 120 to which is adjustably secured the pointer 122 which moves in front of a plate 123 carrying a scale 124 graduated in terms of percentage of maximum flow. It will be noted that the scale 124 is linear, the shaft 112 having angular movements which are linear with respect to percentage of maximum flow.

Secured to the shaft 112 is the hub 127 of a lever 126 which is provided with a turned end providing an abutment 128. Journalled on hub 127 is the hub of a second lever 129 provided with a lug 130 in which is threaded an adjustable screw 131 arranged to engage the abutment 128 and provide a fine zero adjustment for the transmitter.

A third lever 132 has a hub journalled on the hub of lever 129 and is provided with an ear 133 engaging an edge of lever 129 to limit clockwise movement of lever 132 relative to lever 129.

A tension spring 134 is connected between a pin 135 secured in the lever 129 and a pin 136 which may be located selectively in any one of a series of holes 137 in the lever 126. Similarly, a tension spring 139 is connected between the pin 135 and a pin which may be selectively located in any one of a series of holes 141 in the lever 132. The tensions of the springs may be varied by the locations of their anchoring pins in the respective series of holes.

The member 132 is provided with an integral arm 143 to which arm is pivoted the adjustable length link 138 having its upper end pivoted to the lever 140 of a dashpot 142 provided to stabilize operation. The stabilization of operation is desirable to avoid fluctuations in transmission due to irregular movements of the float due to fluctuations in the level of the liquid being measured.

The arrangement just described provides for overtravel of the shaft 112 which has movements following continuously the position of the float. Under what may be considered normal conditions, the three lever arms 126, 129 and 132 have a fixed relationship to each other and to the shaft 112, the springs maintaining engagement of the abutting elements. But if a quick movement of the shaft 112 occurs, so rapid as not to be followed by the dashpot, one or the other of the springs will yield, and if the movement persists the spring will restore the normal condition through slow movement of the dashpot. Overrun of shaft 112 is also permitted if the dashpot arm engages either of its stops, provided by adjustable screws 145 and 147 engageable by its arm 140.

An adjustable length link 144 connects the arm 136 with the operating lever 149 of the pulse transmitter 146 which is shown merely as an assembly since its construction is well known. It will be noted that the arms 143 and 149 are effectively substantially parallel so that the angular rotations of the former are repeated in the latter and under any static conditions the movement of the arm 143 is linear with respect to flow (or percent of maximum flow) so that this linearity of relationship is carried to the transmitter 146. The dashpot arrangement, with its limit screws, and the use of the springs 134 and 139 provide for only slow changes in the input to the transmitter so that it will give accurate average signals irrespective of fluctuations in the liquid level.

The operation of the instrument will be readily apparent from the foregoing description of the elements and their relationships. In summary, as the float 16 follows the change in head of the liquid the arm 68 and cam 74 are moved, and the cam edge 76 is contoured to take into account the $n^{th}$ power of the head H to give through the linkage arrangement a linear response of the pointer 122 relative to the scale 124 and also, on the average, a linear response of the transmitter 146 thereof. In this case, transients are smoothed out as already described. The small adjustments for the change of the exponent $n$ are provided by the setting of the disc 80 which changes the position of the cam contour. The range adjustment is provided by the adjustment of the position of the block 104 in the slot 108 of the lever 110.

Various zero adjustments are provided by the relative adjustability of the levers 86 and 90 and by adjustments of link lengths as already described.

It will be evident that various details of construction and operation may be changed without departing from the invention as defined in the following claims.

What is claimed is:

1. A flowmeter of the type responsive to the level of the surface of a liquid, which level varies with the liquid flow, comprising a float mounted to rest on the liquid surface, an output element, and means connected between the float and the output element to transmit float movements to said output element to provide substantially linear movement of said output element with respect to liquid flow rate, said means including movable means positioned by said float according to the level of the surface of said liquid, a contoured cam mounted on said movable means, a follower riding on said cam, said cam and follower providing for movement of said output element as a function of liquid level raised to an exponential power by an exponent dependent on the flow channel and means for adjusting the position of said cam relative to said movable means to modify said exponent in accordance with the differences in liquid flow channels.

2. A flowmeter of the type responsive to the level of the surface of a liquid, which level varies with the liquid flow, comprising a float mounted to rest on the liquid surface, an output element, and means connected between the float and the output element to transmit float movements to said output element to provide substantially linear movements of said output element with respect to liquid flow rate, said means including a lever, means operated by said float to position said lever according to the level of the surface of said liquid, a contoured cam mounted on said lever, a follower riding on said cam, said cam and follower providing for movement of said output element as a function of liquid level raised to an exponential power by an exponent dependent on the flow channel and means for adjusting the position of said cam relative to said lever to modify said exponent in accordance with the differences in liquid flow channels.

3. A flowmeter according to claim 2 including means pivoting said contoured cam on said lever and in which said lever includes means for adjustably securing said contoured cam against rotation about said pivoting means.

References Cited

UNITED STATES PATENTS

| Re. 15,854 | 6/1924 | Martindale | 73—215 X |
| 1,290,170 | 1/1919 | Gibson | 73—215 |
| 1,296,041 | 3/1919 | Borden | 73—215 |
| 1,321,671 | 11/1919 | Rohlin | 73—215 |
| 1,492,829 | 5/1924 | Buckley | 73—215 X |
| 1,830,413 | 11/1931 | Wagner et al. | 73—215 X |
| 3,182,500 | 5/1965 | Ishii | 73—209 |

FOREIGN PATENTS

| 78,559 | 11/1917 | Switzerland. |

JAMES J. GILL, *Acting Primary Examiner.*

E. D. GILHOOLY, *Examiner.*